Sept. 28, 1965        T. B. EDWARDS        3,208,087

AMPHIBIOUS ASSAULT BRIDGE

Filed Feb. 21, 1963        6 Sheets-Sheet 1

INVENTOR.
THEODORIC B. EDWARDS
BY Joseph G. Hill

ATTORNEY

Sept. 28, 1965   T. B. EDWARDS   3,208,087
AMPHIBIOUS ASSAULT BRIDGE
Filed Feb. 21, 1963   6 Sheets—Sheet 3

INVENTOR.
THEODORIC B. EDWARDS
BY
ATTORNEY

INVENTOR.
THEODORIC B. EDWARDS

Sept. 28, 1965 T. B. EDWARDS 3,208,087
AMPHIBIOUS ASSAULT BRIDGE
Filed Feb. 21, 1963 6 Sheets-Sheet 5

INVENTOR.
THEODORIC B. EDWARDS
BY
ATTORNEY

Sept. 28, 1965 T. B. EDWARDS 3,208,087
AMPHIBIOUS ASSAULT BRIDGE
Filed Feb. 21, 1963 6 Sheets-Sheet 6

INVENTOR.
THEODORIC B. EDWARDS
BY
ATTORNEY

United States Patent Office
3,208,087
Patented Sept. 28, 1965

3,208,087
AMPHIBIOUS ASSAULT BRIDGE
Theodoric B. Edwards, Alexandria, Va., assignor to the United States of America as represented by the Secretary of the Army
Filed Feb. 21, 1963, Ser. No. 260,337
3 Claims. (Cl. 14—1)
(Granted under Title 35, U.S. Code (1952), sec. 266)

The invention described herein may be manufactured and used by or for the Government for governmental purposes without the payment to me of any royalty thereon.

Pontoon bridges in the past have had one great disadvantage in that they require a great amount of time to assemble. Sometimes they involve inflating pontoons, and assembling structural bridgework over these pontons. Because of the time involved in assembling and disassembling these bridges, much of their effectiveness is lost particularly in military combat.

The principal object of this invention is to provide a simple highly versatile assault bridge that can be driven into position in a very short time and bridge nearly any type terrain or body of water.

Another object of this invention is to provide an assault bridge that can be easily used as a bridge, or a ferry.

These and other objects will become apparent as the description proceeds, in which.

Figure 1:
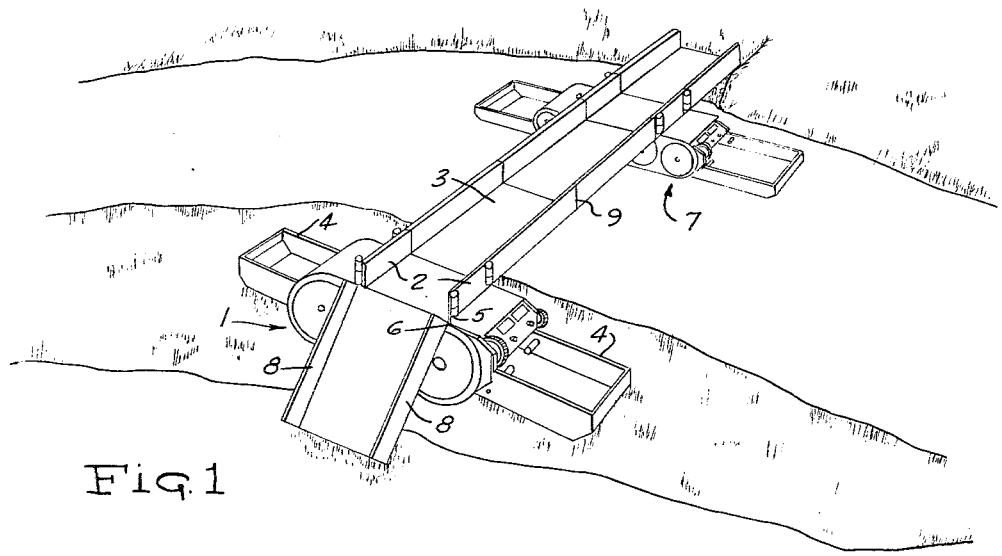
FIG. 1 shows how the separate units of the assault bridge can be joined together to span a large body of water.

Referring to FIG. 1, two amphibious assault bridges are coupled together to form a longer bridge. Amphibious vehicle 1 having pontoons 4 at its front and rear ends lowered, is floating near the shore. Swinging girders 8 are swung into position parallel with stationary girders 2, and floor 3, expanded. The cantilevered floor of two vehicles 1 and 7 are coupled together with fastening means 9. Hinge 5 allows the girders to be hinged horizontally and hinge 6 allows the girders to be lowered to the ground forming a ramp or approach for the bridge.

Figure 2:
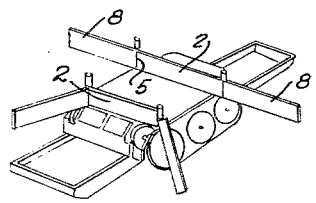
FIG. 2 shows an individual unit of the assault bridge before it is assembled to other units.

FIG. 2 shows the assault bridge vehicle with one set of girders moving out into bridge position and the other set of girders already locked into the bridge position.

Figure 3:
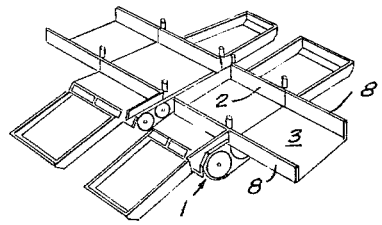
FIG. 3 shows how two of these amphibious units can be joined to form a ferry for crossing a body too large to bridge easily.

In FIG. 3 two of the amphibious assault vehicles are coupled together to form a ferry. The two swinging girders 8 on one side of vehicle 1 are in position perpendicular to stationary girders 2, while the swinging girders 8 on the opposite side of the vehicle are extended parallel with the stationary girders 2. Flooring 3 is extended from between the stationary girders 2 out to the ends of the swinging girders 8, thereby giving a continuous floor across the two vehicles and a cantilevered floor of the same height on both sides of the combined vehicular ferry. The two vehicles are coupled together with fastening means at the abutting sides of the two vehicles.

As can be seen from FIGS. 1, 2, and 3, the amphibious assault bridge is a highly versatile piece of equipment. It can be used either on land or water, and either alone or in conjunction with other similar amphibious assault bridges. When the body of water to be crossed is small and the traffic across the water is great, several vehicles can be joined together as shown in FIG. 1 to give a bridge from shore to shore. If the distance from one bank to the opposite bank makes it impractical for a multiple amphibious bridge to be constructed, a ferry can be used as shown in FIG. 3.

Figure 4:
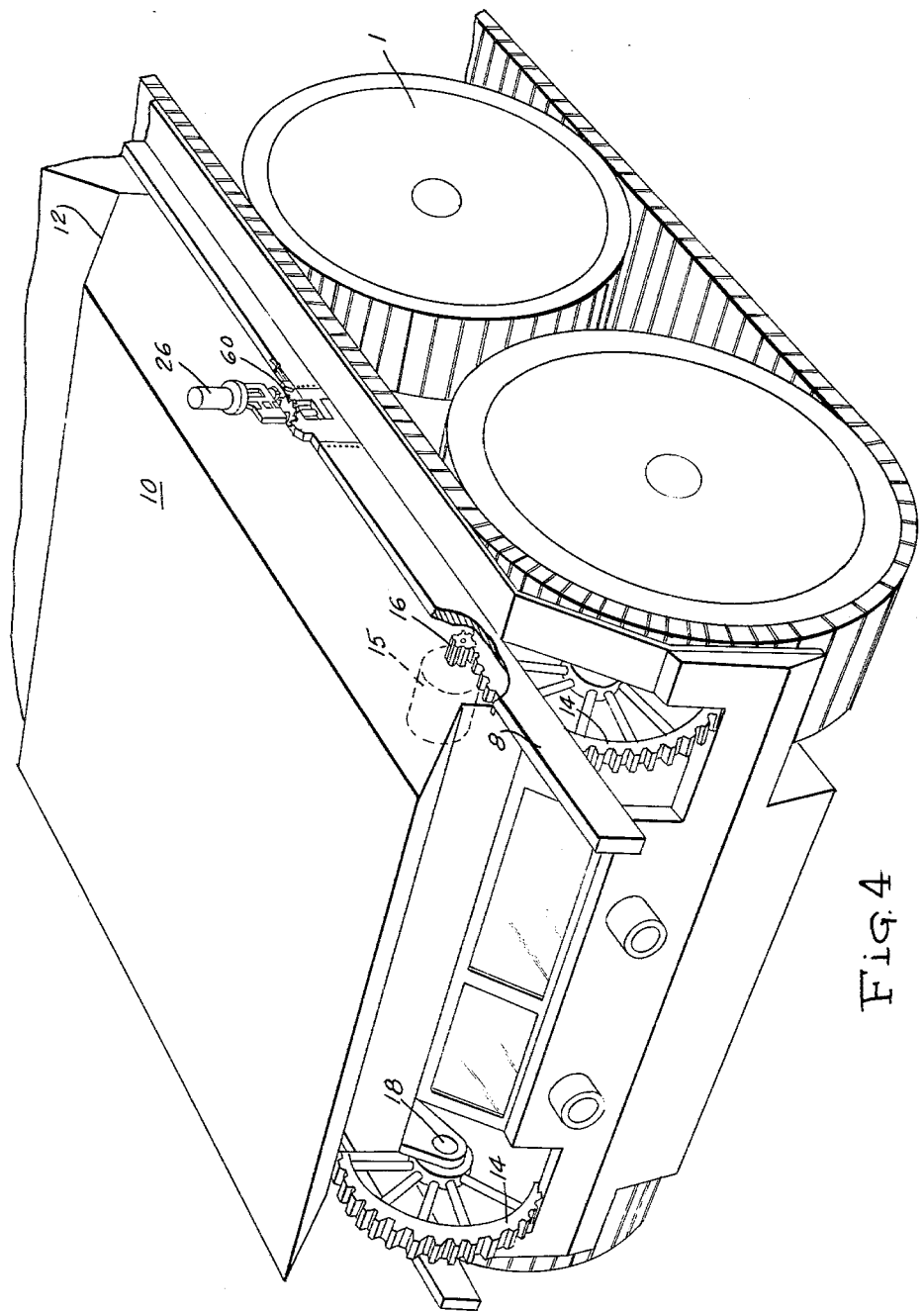
FIG. 4 is a perspective view of the assault bridge showing the front pivotal pontoons raised in the land travel position.
Figure 5:
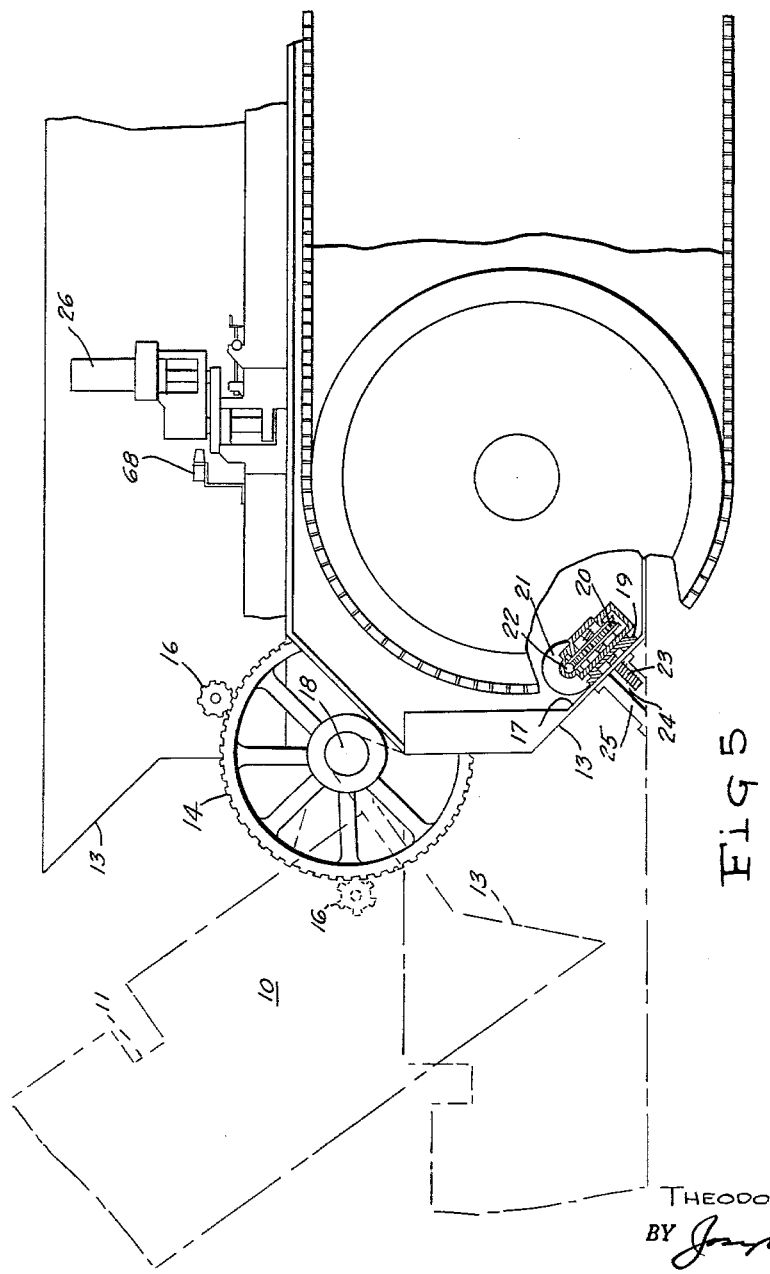
FIG. 5 is a side view of the amphibious assault bridge showing the pontoon and locking mechanism therefor.

FIG. 5 shows pontoon 10 that is pivotally mounted to the front of vehicle 1. Although only the front pontoon is shown in detail, there is an identical pontoon mounted on the rear of the amphibious vehicle. At the front of the pivotal pontoon is an angular portion 12 shown in FIG. 4 forming a runner for the vehicle as it enters the water or comes out of the water onto land. This runner will be in front of the amphibious vehicle when the pontoon is lowered. A notch 11 is provided across the top of the pontoon so that when it is pivoted onto the top of the vehicle the pontoon will fit over the stationary girder across the vehicle. The notch 11 is tailored to fit the position and size of said stationary girder. At the rear lower edge of pontoon 10 is an angular protrusion 13. The purpose of the protrusion is to allow the pontoon to be securely attached to the vehicle with the pontoon in its floating position. Opposite the protrusion 13 is a mating bevel on the front of vehicle 1. As the pontoon 10 is lowered into position, protrusion 13 abuts with bevel 17 thereby giving a place for a locking means to hold the pontoon in its floating position. The whole pontoon is pivoted about pin 18 on the front of the vehicle. Gear 14 is a sector fastened to the frame of the vehicle through pin 18. Motor 15 shown in FIG. 4 is reversible and has a small gear 16 on its shaft, said gear meshing with the sector gear 14. Motor 15 is mounted on the pontoon and moves therewith. Gear 16 follows around sector gear 14. When the motor 15 is turned on, the pontoon is raised upon the vehicle 1 so that the vehicle can travel on land without the cumbersome pontoons protruding at its front and rear ends. Reversal of motor 15 lowers the pontoon into floating position and the locking means as illustrated in FIG. 5 can be engaged to hold protrusion 13 and bevel 17 together. This locking means will prevent the pontoon from flying up and pivoting around axle 18 when the amphibious vehicle hits the water.

The locking means shown in FIG. 5 is a detailed view of the mechanism within protrusion 13 and bevel 17. The locking mechanism is essentially a motor driven screw lock. A reversible motor 21 drives a worm gear 22 which in turn drives gear 20. Gear 20 and its housing are supported by mounting 19. Threaded screws 23 which is an extension of the shaft of gear 20 is coupled with a spherical threaded receiver 24, said receiver held in alignment with screw 23 by a socket within mounting 25. Locking is accomplished by lowering the pontoon so that screw 23 is in line with threaded receiver 24 and energizing motor 21. This tightens screw 23 and causes the pontoon to be securely fastened in place. Reversing motor 21 will unlock the pontoon when it is pivoted to the land traveling position.

The top view of FIG. 2 shows the relative positions of the stationary girders 2 and swinging girders 8. Stationary girders 2 are permanently fixed crosswise on vehicle 1. At each end of the stationary girder is hinge 5 and the torsional motor mounting, not shown in detail in this drawing. When the expendable flooring is to be extended, girders 8 are swung into position in axial alignment with the stationary girders 2. This gives a continuous span across both the stationary and swinging girders for the expendable floor. For land travel the swinging girders 8 are swung adjacent to the vehicle 1 after the floor is contracted into the space between stationary girders 2.

Figure 7:
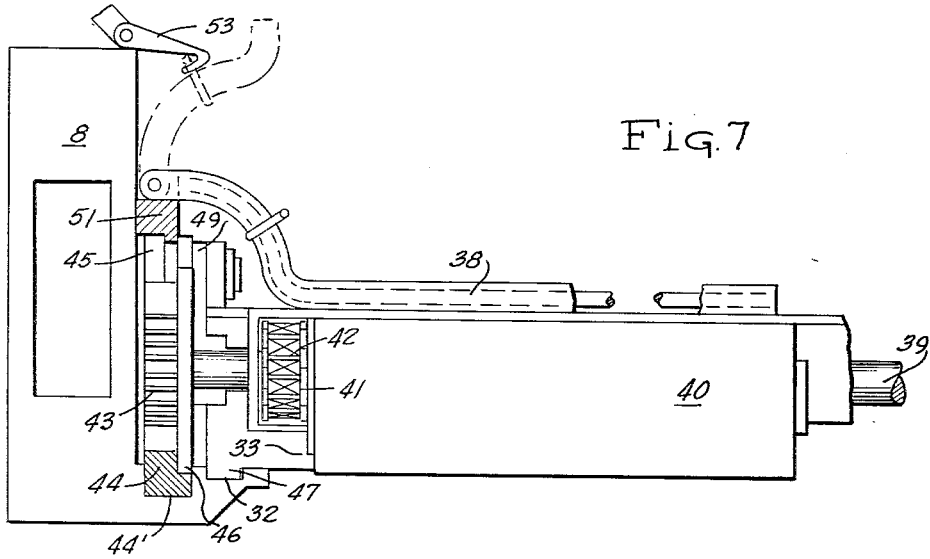
FIG. 7 is a front view of the carriage assemblage in relationship with a swinging girder.

Groove 32 in FIG. 7 also running the length of the girder is a guide for a small projection on the ends of each slat.

Figure 6:
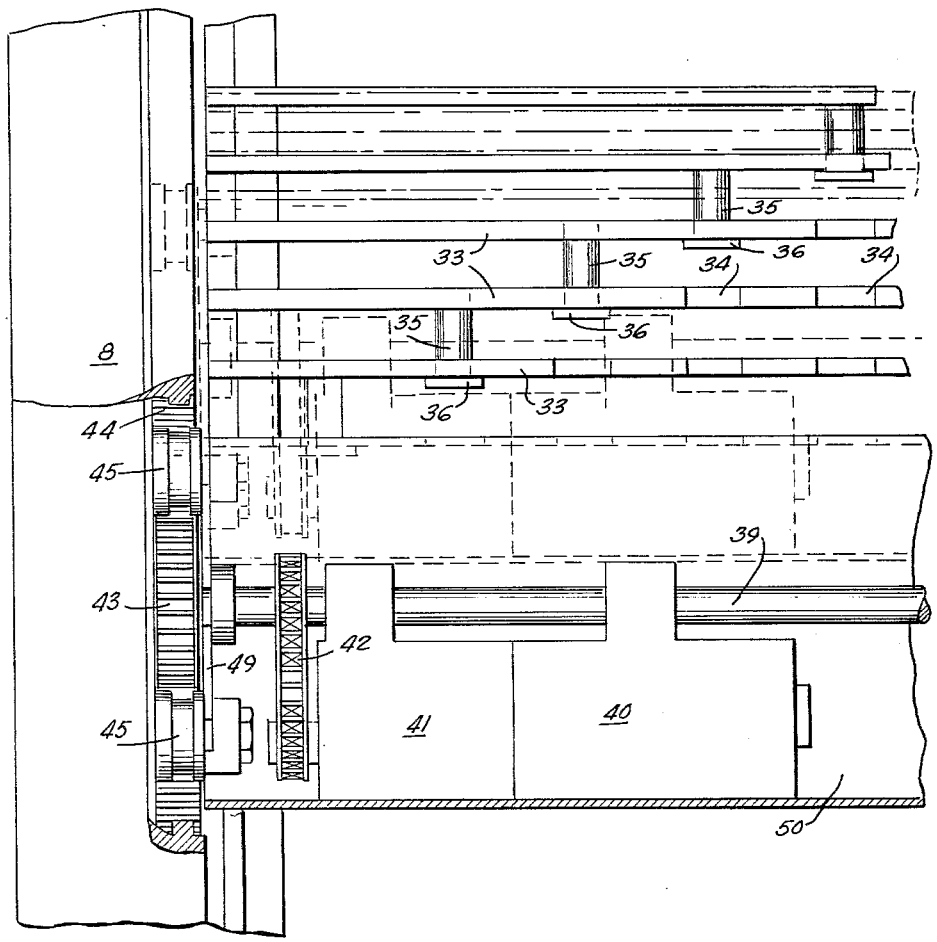
FIG. 6 is a top view of the flooring in the assault bridge and the motorized carriage.

A more detailed illustration of the structure of the expandable flooring is shown in FIG. 6. In the top view of the expanded flooring, a series of slats 33 are equally spaced and on edge so that weight placed on the floor acts on its edge instead of the face of each slat. At intervals across the slats are spools 35. These spools serve as limit stops when the floor is expanded. Each spool is welded at one end to slat 33 in a position perpendicular to the slats. At the opposite end of each spool is a flange 36, which stops the slat adjacent to the slat to which the spool is welded from extending beyond a fixed distance. The hole in the adjacent slat is the same diameter as the body of the spool thereby causing flange 36 to stop the movement of the slats when they are a fixed distance apart because the external diameter of the flange is larger than the hole in which the body of the spool slides. Holes 34 which are slightly larger than the external diameter of the flange 36 are in axial alignment with the spool 35. These holes in the slats give a recess for the spool when the flooring is contracted into a solid flooring between the stationary girders.

The slats of the flooring are shown in dotted lines in a closed position near the top of FIG. 6 when it is contracted. Slats 33 are in face relationship with one another and spools 35 extend into the recesses formed by the holes 34 in the slats.

It is obvious that the number of sets of slats 33, and the accompanying operating mechanisms therefor, is determined by the length of the completed floor. That is, the length of girders 8 plus the mounting distance within fixed girders 2 determines the number of slats to be used. A set for each direction from the center of slats 2 could be sufficient or a third set for the space between slats 2 alone could be used. In the stored, or not in use, position, the slats would be over the hull, between the fixed girders 2.

Figure 8:
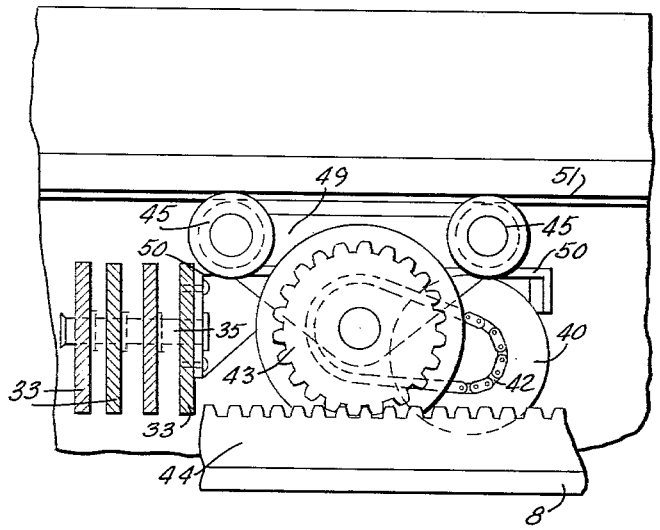
FIG. 8 is an end view of the carriage assembly and expansible flooring.

FIGS. 6, 7, and 8 are detailed illustrations of the carriage assembly that opens and closes the expandable flooring. A carriage assembly is attached to the end slat and by pulling this end slat out onto the swinging girders, the remaining slats will be opened because the limit stop spools will act to pull each successive slat into its expanded position. The carriage is essentially a gear driven cog rail system with a tractor that travels back and forth along the girders.

FIG. 6 is a top view of the carriage assembly showing the motive means for the carriage. The carriage is supported on axle 39 which spans the distance between the two girders 8. Motor 40 and geared speed reducer 41 are mounted to the axle 39. Speed reducer 41 drives a chain drive 42 to pinion gear 43, said pinion gear running along rack 44. The pinion gears are mounted on each end of axle 39. At each end of the axle is a triangular plate 49, with the axle attached to one apex of said triangular plate. The triangular plate has its two other apexes above the axle and at each apex is attached a roller 45 with a center groove about its circumference. These two rollers 45, fit in a guide track along the girder above the rack gear. With the pinion gear 43 and the two rollers 45 mounted on the triangular plate 49, a three wheeled support is provided at each end of axle 39 that can move back and forth parallel to girders 8. A housing 50 fits over the whole carriage assembly and the top of this housing forms a portion of the floor above the carriage assembly. At the front and rear of the housing are braced overhangs, to protect the carriage assembly at the front and rear. The rear overhang also provides a means whereby the end slat can be attached to the carriage assembly.

Referring to FIG. 7 which is a front view of the carriage assembly, axle 39 with pinion gear 43 at each end is supported by the two girders 8. Motor 40 through speed reducer 41 and chain drive 42 powers pinion gear 43. Rack 44 is fixed in groove 44' but is not as wide as the groove. The rack is placed next to the edge of groove 44' closest to the side member of girder 8. This leaves a channel within groove 44' that is bounded on one side by the gear rack 44 and on the other side by the side of groove 44' farthest from the side member of girder 8. Within this channel next to the gear rack 44 and on a protruding track formed in the material which forms rack 44, the weight bearing flange 46 of pinion gear 43 rolls along. This weight bearing flange 46 which is larger in diameter than the pinion gear keeps the weight of the complete carriage assembly off the pinion gear 43 and rack 44. A protrusion 47 on the end of each slat 33 rides in groove 32. Triangular plate 49 mounted on the axle 39 supports rollers 45, said rollers guiding the carriage assembly along guide track 51. Reinforced rubber mating 38 is hinge mounted to girder 8 by hinge 52 and when the mat is not in use it is manually lifted up and held out of the way of the operation of the expandable flooring by hook 53.

The end view of the carriage assembly in FIG. 8 shows how the pinion gear 43 meshes with the gear rack 44, and how the weight bearing flange 46 travels along in a channel of groove 44'. Triangular plate 49 holds guide rollers 45 in position so that they can roll along guide track 51. Motor 40 drives pinion gear 43 through chain drive 42 and since the motor is mounted on the axle, it travels along with the carriage assembly. The front slat of slats 33 is connected to the vertical rear braced overhang of housing 50 by means of spools 35. As the carriage assembly travels back and forth along the tracks of girders 8 the expandable flooring is opened and closed.

Figure 9:
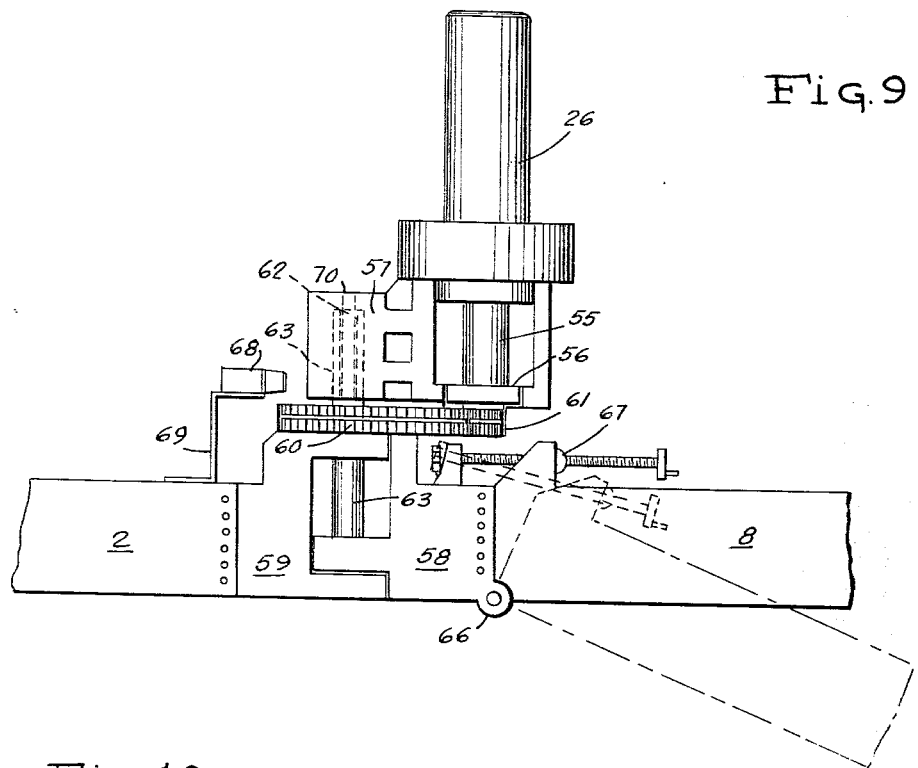
FIG. 9 is a detailed front view of the torsional motor mounting and hinge mechanism of the swinging girder.

FIG. 9 shows the hinge assembly and torsional motor mounting between the stationary girders and swinging girders. At the end of stationary girder 2 is a U-shaped hinge member 59 which is bolted to said stationary girder. The two arms of member 59 have a hole through them to receive a pivot pin 63. An opposing hinge member 58 is also U-shaped but the top arm of hinge member 58 has a gear sector 60 designed right into the arm itself. The hinge member 58 also has a hole for pivot pin 63 through each of its arms. Swinging girder 8 is supported by hinge member 58 which has its upper arm riding on the upper arm of hinge member 59, and its lower arm riding on the lower arm of hinge member 59. Gear sector 60 of hinge member 58, since it is integral with the hinge member itself, provides means whereby the hinge member 58 can be pivoted about pivot pin 63.

Pivot pin 63 is not only the pivot for the two hinge members but also serves as a support for the motor mounting 57. Pivot pin 63 is shown in more detail in FIG. 11, but is comprised essentially of a shaft with a circular exterior and circular center bore through most of its length. At one end of pivot pin 63 is a square passage in alignment with and joining with the center circular bore. Within the bore of pivot pin 63 is a series of leaf springs forming a square torsion bar 62. The torsion bar 62 is longer than the pivot pin 63 within which it fits so that there is an extention at the top of said pivot pin on which to attach motor mounting 57. At the bottom of hollow pivot pin 63 the square torsion bar 62 is fitted into and pinned to the square passage. The bottom of pivot pin 63 is in turn pinned to the lower arm of hinge member 59. In this manner both the pivot pin 63 and the torsion bar 62 are held stationary by hinge member 59. Although the pivot pin 63 cannot rotate, the torsion bar 62 comprised of several leaf springs can be rotated at its top end by placing the leaf springs in torsion. The torsion is caused because the bottom of torsion bar 62 is pinned through pivot pin 63 to hinge member 59, said hinge member being bolted to stationary girder 2. With the pivot pin 63 secured to hinge member 59, hinge member 58 with girder 8 can rotate about the pivot pin.

The torsional mounting of the motor is accomplished by having motor mounting 57 fitting over the portion of pivot pin 63 that extends above the gear sector 60 of hinge member 59. A recess hole in motor mounting 57 that is slightly larger in diameter that the outside diameter of pivot pin 63 allows the motor mounting 57 to rotate freely about the end of the pivot pin. The free rotation of the motor mounting about pivot pin 63, however, is prevented by the torsional bias of torsion bar 62. The square torsion bar formed by the leaf springs fits into a square hole 70 in motor mounting 57. Since the torsion bar is fixed at the bottom end to hinge member 59 and at the top end to a rotatable motor mounting 57, the motor mounting is held in a center position and when it moves either clockwise or counterclockwise it has to move against the torsional stress within torsion bar 63. In this way the motor mounting 57 is torsionally biased in both directions of rotation. Motor mounting 57 supports motor 26 so that motor shaft 55 with gear 61 is in alignment with the gear sector of hinge member 60. Bearing 56 acts to steady the motor shaft 55. The reversible motor 26 acting through gear 61 rotates hinge member 58 thereby swinging girder 8 either to its land travelling or bridge position.

The vertical hinging of the swinging girders is accomplished by a hinge 66 at the bottom of girder 8 and a screw adjusting means 67 at the top of girder 8. This adjusting means 67 holds the girder erect in the bridge position and loosening it will let the girder 8 pivot downward to create a ramp for use along the shore line.

An offset L-shaped bracket 69 holds a limit stop switch 68 which cuts off the current to motor 26 when the motor mounting 57 swings around and engages the switch. A similar switch, not shown, limits the movement of the motor mounting in the opposite direction. With these two limit switches, the reversible motor and motor mounting pivot about the pivot pin 63 from one extreme to the other on opening and closing swinging girder 8.

Figure 10:
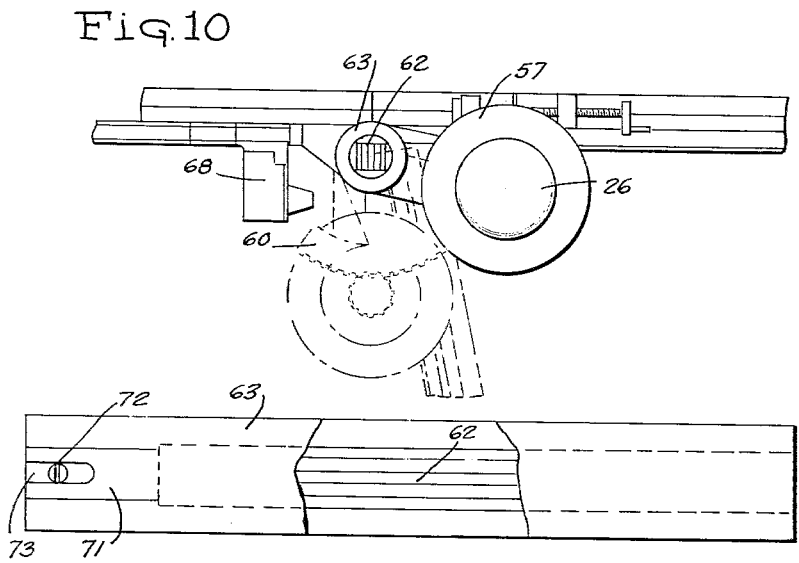
FIG. 10 is a top view of the torsional motor mounting and hinge mechanism of the swinging girder.

Perhaps a clearer understanding of how the swinging motor mount operates can be derived from FIG. 10 which is a top view of the hinge assembly and motor mounting. Swinging girder 8 and stationary girder 2 are in alignment when the motor 26 is at one end of the gear sector, and swinging girder is perpendicular to the stationary girder when the motor is at the opposite end of gear sector 60. Instead of having the motor mounted rigidly in place and only the gear sector 60 moving, the motor itself climbs back and forth around the gear sector, thereby putting tension on the gear sector and moving it. The reason for the torsional mounting of motor 26 is so that the swinging girder will be locked in place either parallel to the stationary girder or perpendicular to it. The locking occurring because there is tension placed at the joint by means of the torsion bar 62. Such torsional locking insures that the gear track of the swinging girder 8 will always be snugly fit to the gear track of stationary girder 2 and the carriage assembly can easily travel across the joint.

Figure 11:
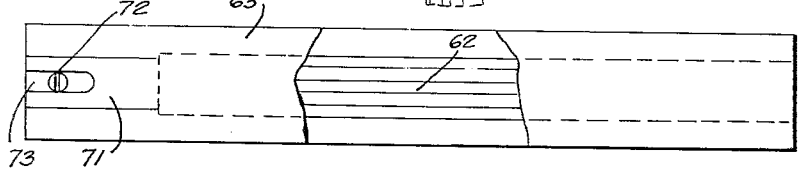
FIG. 11 is an enlarged view of the pivot pin of the torsional motor mounting.

The pivot pin 63 is shown in more detail in FIG. 11. As can be seen from the figure, the pivot pin is comprised of a hollow cylindrical member 63 having at one end a square bore 71. This square bore extends only a short distance through the cylindrical member and serves to anchor the square torsion bar to the pivot pin. The torsion bar is held in place within the pivot pin by means of an Allen screw within threaded hole 72. Key slot 73 in conjunction with a similar slot in the bottom arm of hinge member 59 holds the pivot pin from rotating within hinge member 59. Both the pivot pin 63 and torsion bar 62 are held rigidly to the hinge member 59 with the key and Allen screw.

FIG. 10 is a top view of the torsional motor mounting showing the relationship of the movable motor mounting 57 and the limit stop switch 68. As the motor mounting 57 and motor 26 swing the girders into bridge position the motor mounting contacts limit switch 68 cutting the current to the motor 26. While the motor is in this position the torsional bar 62 comprised of a series of leaf springs is under stress thereby in turn causing a stress to be put on gear sector 60. This stress holds the swinging girder firmly in its bridge position. The opposite is also true when the swinging girder is swung into its land traveling position. Here the motor and motor mounting walk around the gear sector 60 putting a torque in the opposite direction on the torsion bar. This torque is transmitted to the gear sector 60 and the swinging girder is firmly held in the land traveling position perpendicular to the stationary girders. The torsional motor mounting allows the girders to be swung 90° from perpendicular to parallel with the stationary girders and also to torsionally lock them in either of these two extreme positions.

I claim:

1. In combination, an amphibious vehicle, a pair of stationary girder means mounted on said vehicle, two pairs of swinging girder means, means connecting one end of each of said swinging girder means one to each end of said stationary girder means for horizontal and vertical swinging movement, means for locking said swinging girder means in parallel relation to each other and in alignment with said stationary girder means, floor receiving track and guide means incorporated in all of said girder means, and expandable floor means slidable in said track and guide means.

2. In combination, an amphibious vehicle, a plurality of parallel stationary girder means mounted on said vehicle, a plurality of swinging girder means, means connecting one end of each of said swinging girder means one to each end of said stationary girder means for horizontal and vertical swinging movement, means for locking said swinging girder means in parallel relation to each other and in alignment with said stationary girder means, track means in said girder means and expandable floor means mounted in and slidable in said track means.

3. The combination of claim 2 in which said stationary girders are perpendicular to the sides of said vehicle.

References Cited by the Examiner

UNITED STATES PATENTS

| 2,321,677 | 6/43 | Higgins | 14—27 |
| 2,636,197 | 4/53 | Odot | 14—27 |
| 2,993,459 | 7/61 | Storey | 14—27 X |
| 3,010,128 | 11/61 | Gillois et al. | 14—1 |
| 3,021,544 | 2/62 | Gillois et al. | 14—1 |

CHARLES E. O'CONNELL, Primary Examiner.

JACOB L. NACKENOFF, Examiner.